United States Patent
Xi et al.

(10) Patent No.: US 10,489,642 B2
(45) Date of Patent: Nov. 26, 2019

(54) HANDWRITING AUTO-COMPLETE FUNCTION

(71) Applicant: Cisco Technology, Inc., San Jose, CA (US)

(72) Inventors: Yasi Xi, Hefei (CN); Zhaocai Wang, Hefei (CN); Jianbin Fang, Hefei (CN); Weiwei Chen, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 15/730,972

(22) Filed: Oct. 12, 2017

(65) Prior Publication Data

US 2019/0114478 A1    Apr. 18, 2019

(51) Int. Cl.
- *G06K 9/00* (2006.01)
- *G06F 3/0488* (2013.01)
- *G06K 9/22* (2006.01)
- *G06F 3/023* (2006.01)

(52) U.S. Cl.
CPC ....... *G06K 9/00436* (2013.01); *G06F 3/0237* (2013.01); *G06F 3/04883* (2013.01); *G06K 9/222* (2013.01)

(58) Field of Classification Search
CPC .. G06K 9/00436; G06K 9/222; G06F 3/0237; G06F 3/04883
See application file for complete search history.

(56) References Cited

U.S. PATENT DOCUMENTS

| | | | | |
|---|---|---|---|---|
| 7,346,229 | B2* | 3/2008 | Dresevic | G06F 17/211 345/698 |
| 7,346,230 | B2* | 3/2008 | Dresevic | G06F 17/211 345/698 |
| 7,996,589 | B2* | 8/2011 | Schultz | G06F 3/04883 345/156 |
| 8,731,299 | B2* | 5/2014 | Hawkins | H04M 3/56 348/14.08 |
| 8,943,092 | B2* | 1/2015 | Dai | G06K 9/222 707/769 |
| 8,994,732 | B2* | 3/2015 | Lee | G06F 9/451 345/440 |
| 9,116,871 | B2* | 8/2015 | Isabel | G06F 17/241 |
| 9,411,508 | B2* | 8/2016 | Goldsmith | G06F 3/04883 |
| 9,507,435 | B2* | 11/2016 | Markiewicz | G06F 3/0237 |
| 9,665,259 | B2* | 5/2017 | Lee | G06F 3/04845 |
| 9,966,065 | B2* | 5/2018 | Gruber | G06F 17/2705 |

(Continued)

*Primary Examiner* — Mia M Thomas
(74) *Attorney, Agent, or Firm* — Edell, Shapiro & Finnan, LLC

(57) ABSTRACT

A method and apparatus for an auto-complete function in a user's handwriting for touch screen devices is described. In one embodiment, the method includes receiving, from a touch-screen display, a handwriting input. The handwriting input is converted into textual information. Based on the textual information, one or more prompt options are generated. The one or more prompt options are rendered for display on the touch-screen display in a similar appearance as the handwriting input. The method can further include receiving a selected prompt option input and rendering the selected prompt option for display on the touch screen display in a similar appearance as the handwriting input.

20 Claims, 10 Drawing Sheets

(56) References Cited

U.S. PATENT DOCUMENTS

| | | | |
|---|---|---|---|
| 2005/0105945 A1* | 5/2005 | Dresevic | G06F 17/211 |
| | | | 400/62 |
| 2008/0294982 A1* | 11/2008 | Leung | G06F 17/276 |
| | | | 715/261 |
| 2012/0176546 A1* | 7/2012 | Yoon | H04N 21/4431 |
| | | | 348/600 |
| 2014/0250143 A1* | 9/2014 | Dai | G06K 9/222 |
| | | | 707/769 |
| 2015/0043824 A1* | 2/2015 | Akhavan Fomani | |
| | | | G06F 3/0237 |
| | | | 382/188 |
| 2015/0130724 A1* | 5/2015 | Feng | G06F 3/04883 |
| | | | 345/173 |
| 2015/0135115 A1* | 5/2015 | Feng | G06F 3/04883 |
| | | | 715/771 |
| 2016/0283777 A1* | 9/2016 | Holden | G06K 9/00154 |
| 2016/0328624 A1* | 11/2016 | Angelov | G06Q 10/101 |
| 2018/0032505 A1* | 2/2018 | Hoetzer | G06N 7/005 |
| 2018/0217970 A1* | 8/2018 | Dev | G06F 3/04883 |
| 2018/0349017 A1* | 12/2018 | Chen | G06F 3/04883 |

* cited by examiner

HANDWRITING AUTO-COMPLETE FUNCTION

TECHNICAL FIELD

This disclosure relates generally to an auto-complete function in a user's handwriting for touch screen devices.

BACKGROUND

Real-time collaboration systems allow two or more users to remotely work on the same workspace, such as an electronic board that can function as a whiteboard and/or video monitor. Such collaboration systems are useful for sharing information among multiple collaborators or participants, without requiring them to be physically collocated. Collaboration often involves the sharing of visual information (e.g., printed material such as articles, drawings, photographs, charts and graphs, as well as video and computer-based animations, visualizations and other displays) in such a way that the participants can collectively and interactively examine, discuss, annotate, and revise the information.

DESCRIPTION OF EXAMPLE EMBODIMENTS

Overview

Presented herein is an apparatus and method for providing an auto-complete function in a user's handwriting for touch screen devices. In an example embodiment, an apparatus may include a display configured to receive touch user input. The apparatus may also include a display controller coupled to the display to supply display data for presentation on the display and to detect touch user input on the display. The apparatus also includes a processor coupled to the display controller. The processor may be configured to convert handwriting input to the display into textual information. The processor may also be configured to generate one or more prompt options based on the textual information. The processor may also be configured to render the one or more prompt options in a similar appearance as the handwriting input from the user and supply display data for the one or more prompt options to the display controller to the rendered prompt options on the display.

In another example embodiment, a method may include receiving, from a touch-screen display, a handwriting input. The method may also include converting the handwriting input into textual information. The method may also include generating one or more prompt options based on the textual information. The method may also include rendering for display on the touch-screen display the one or more prompt options in a similar appearance as the handwriting input.

Example Embodiments

Figure 1:
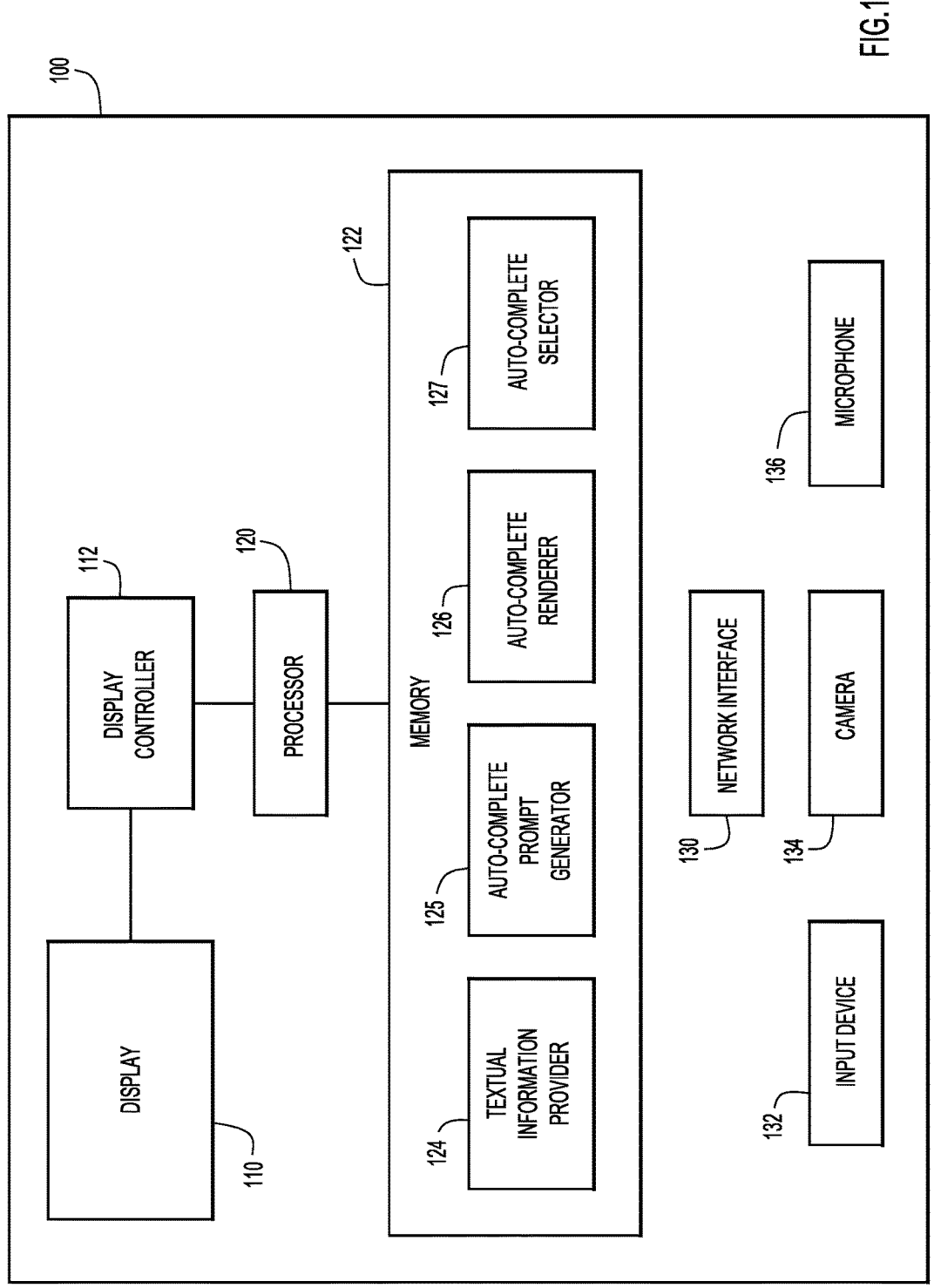
FIG. 1 is a block diagram showing an example of apparatus configured to perform the handwriting auto-complete function, according to an example embodiment.

FIG. 1 is a block diagram showing an example of an apparatus 100 in which an auto-complete function can be implemented, according to an example embodiment. Apparatus 100 may be a display device that can be used to display and input information by a user. For example, apparatus 100 may be a touch screen device, an interactive whiteboard, or other electronic display device. Apparatus 100 includes a display 110, a processor 120, a main memory 122, and a network interface 130. Apparatus 100 may also be configured to receive input from a plurality of input sources, including an input device 132, a camera 134, and a microphone 136. In one form, the apparatus may be a tablet computing device or laptop computer having a touch screen display.

In an example embodiment, display 110 may be configured to receive touch user input or user input with a hand-held stylus. For example, display 110 may be a touch screen display. Display 110 may be in communication with a display controller 112 that is configured to provide signals to display 110 to generate text, images, and/or video for apparatus 100. Display controller 112 may be in communication with processor 120 for receiving instructions to generate the text, images, and/or video for apparatus 100. Display controller 112 may also be configured to provide signals to generate images, illustrations, and/or annotations corresponding to inputs received from one or more input sources, such as input device 132.

Apparatus 100 may further include a bus (not shown) or other communication mechanism coupled with processor 120 for communicating information between various components. While the figure shows a single block 120 for a processor, it should be understood that the processor 120 may represent a plurality of processing cores, each of which can perform separate processing functions.

Apparatus 100 may also include a main memory 122, such as a random access memory (RAM) or other dynamic storage device (e.g., dynamic RAM (DRAM), static RAM (SRAM), and synchronous DRAM (SD RAM)), coupled to the bus for storing information and instructions to be executed by processor 120. For example, software configured to provide utilities/functions including a textual information provider 124, an auto-complete prompt generator 125, an auto-complete renderer 126, and/or an auto-complete selector 127 is stored in memory 122 for providing one or more operations of the auto-complete function described herein. The details of the processes implemented by textual information provider 124, auto-complete prompt generator 125, auto-complete renderer 126, and auto-complete selector 127 according to the example embodiments will be discussed further below. In addition, main memory 122 may be used for storing temporary variables or other intermediate information during the execution of instructions by processor 120.

Apparatus 100 may further include other components not explicitly shown or described in the example embodiments. For example, apparatus 100 may include a read only memory (ROM) or other static storage device (e.g., programmable ROM (PROM), erasable PROM (EPROM), and electrically erasable PROM (EEPROM)) coupled to the bus for storing static information and instructions for processor 120. Apparatus 100 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to apparatus 100 using an appropriate device interface (e.g., small computer system interface (SCSI), integrated device electronics (IDE), enhanced-IDE (E-IDE), direct memory access (DMA), or ultra-DMA).

Apparatus 100 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Apparatus 100 performs a portion or all of the processing steps of the process in response to processor 120 executing one or more sequences of one or more instructions contained in a memory, such as main memory 122. Such instructions may be read into main memory 122 from another computer readable medium, such as a hard disk or a removable media drive. One or more processors in a multi-processing arrangement may also be employed to execute the sequences of instructions contained in main memory 122. In alternative embodiments, hard-wired circuitry may be used in place of or in combination with software instructions. Thus, embodiments are not limited to any specific combination of hardware circuitry and software.

As stated above, apparatus 100 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling apparatus 100, for driving a device or devices for implementing the process, and for enabling apparatus 100 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

In an example embodiment, apparatus 100 may be configured to communicate with one or more remote devices over a communication network. Accordingly, apparatus 100 may include network interface 130 to allow apparatus 100 to communicate with the remote devices over the communication network. Network interface 130 may be, for example, one or more network interface cards configured to enable network communications. An example embodiment of a communication session between an apparatus and one or more remote devices will be described in more detail below in reference to FIG. 10.

As described above, apparatus 100 may include a plurality of input sources that are configured to provide input to apparatus 100. For example, the plurality of input sources may include input device 132, camera 134, and microphone 136. Input device 132 may be a stylus, electronic pen or marker, or other similar device that is configured to contact display 110 and provide input to apparatus 100. Input device 132 may be used by a user to draw or write on display 110 of apparatus 100. With this arrangement, a user may generate a handwriting input on display 110 using input device 132. Additionally, apparatus 100 may include other input sources that are configured to assist with using apparatus 100 during a communication session. For example, apparatus 100 may include camera 134 configured to provide images and/or video, as well as microphone 136 configured to provide sound and spoken communication from a user.

Apparatus 100 may additionally or optionally include other components not explicitly shown in the Figures or described herein. For example, apparatus 100 may include speakers, input buttons, a keyboard, a mouse, or other input sources and/or peripheral devices.

In an example embodiment, apparatus 100 may include modules embodied in hardware and/or software described above that are configured to provide utilities of textual information provider 124, auto-complete prompt generator 125, auto-complete renderer 126, and/or auto-complete selector 127 for providing one or more operations of the auto-complete function, as described below.

Figure 2:
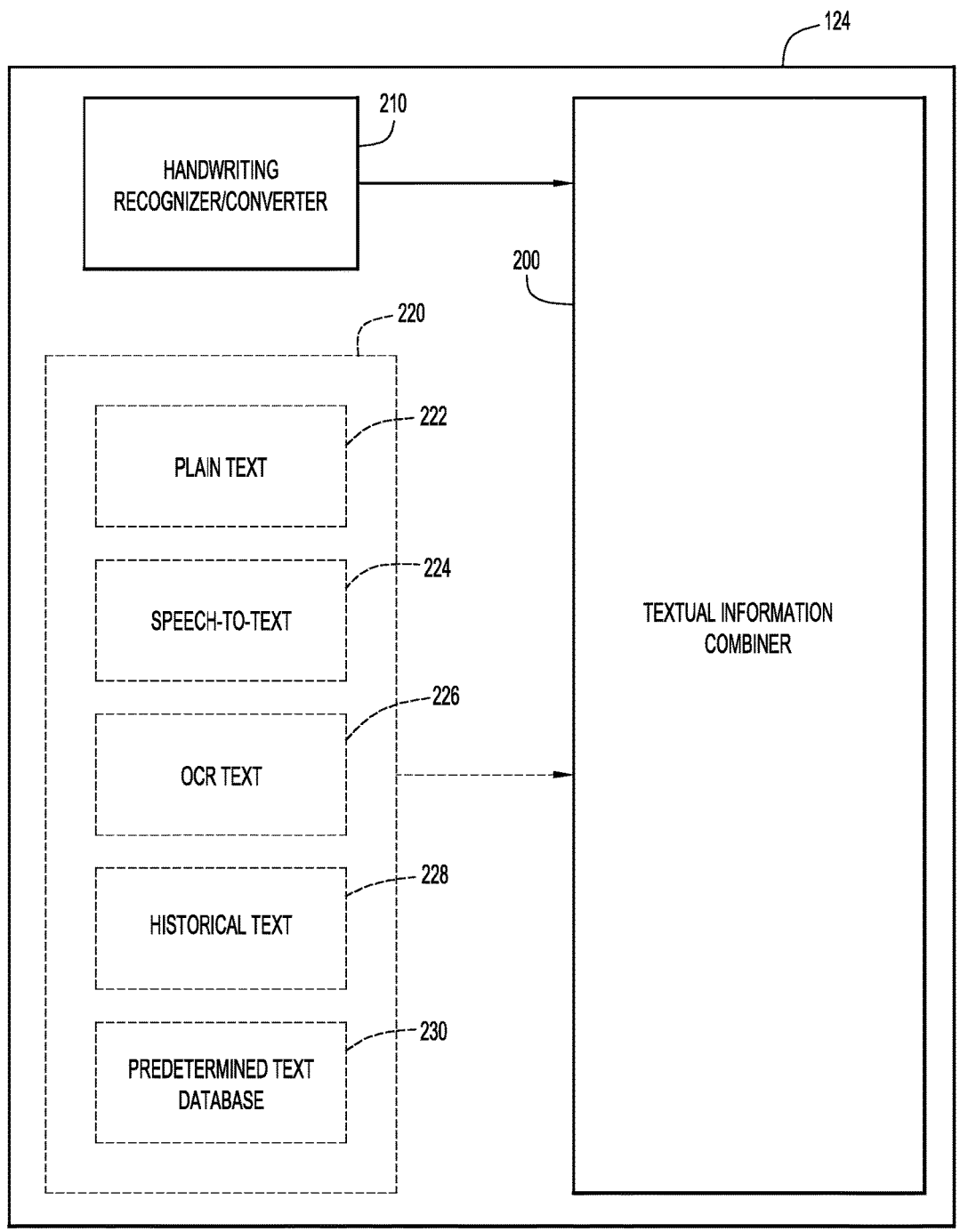
FIG. 2 is a block diagram illustrating a variety of textual source inputs that may be supplied to the handwriting auto-complete function, according to an example embodiment.

Referring now to FIG. 2, a block diagram illustrating a variety of possible textual source inputs available to textual information provider 124 of apparatus 100 is shown according to an example embodiment. The auto-complete function of the example embodiments may use multiple sources of textual information to generate and provide prompt options to a user of apparatus 100. A textual information combiner 200 may gather and aggregate textual information obtained from multiple sources, including a handwriting recognizer/converter 210 and one or more additional textual information sources 220. For example, additional textual information sources 220 may include plain text 222, converted speech-to-text 224, optical character recognition (OCR) text 226, historical text 228, predetermined text database 230, and/or other sources of textual information.

It should be understood that additional textual information sources 220 may be optional for apparatus 100 and the method described herein. The auto-complete function of the example embodiments may use the textual information input received from handwriting recognizer/converter 210 that recognizes and converts a user's handwriting into the textual information input. However, including additional textual information sources 220 may assist auto-complete prompt generator 125 with generating suggested prompt options that are more relevant to the particular circumstances of a user session.

Textual information from additional textual information sources 220 may be obtained during a user session with apparatus 100. For example, plain text 222 may include text appearing on display 110 of apparatus 100. Speech-to-text 224 may include text that has been converted from spoken words received by microphone 136. OCR text 226 may include text obtained from documents or images shown on display 110 using optical character recognition software and/or processes. Historical text 228 may include any prior textual information converted from a handwriting input, prior plain text input, prior speech-to-text converted input, or prior OCR text input from earlier in the user session. Predetermined text database 230 may include a dictionary or similar archive of known words or terms that is stored in memory 122 of apparatus 100. Additionally, other sources of textual information may be available to apparatus 100 to provide additional textual information.

In an example embodiment, textual information from handwriting recognizer/converter 210 and any additional textual information from additional textual sources 220 may be combined by textual information combiner 200. The textual information may then be passed to auto-complete prompt generator 125 where the textual information is used to generate one or more prompt options. The prompt options may then be passed to auto-complete renderer 126 where the corresponding graphics and images are generated to display the prompt options on display 110 of apparatus in a similar appearance as the user's handwriting input obtained from handwriting recognizer/converter 210. The method according to an example embodiment will be described in more detail below in reference to FIG. 3.

Figure 3:
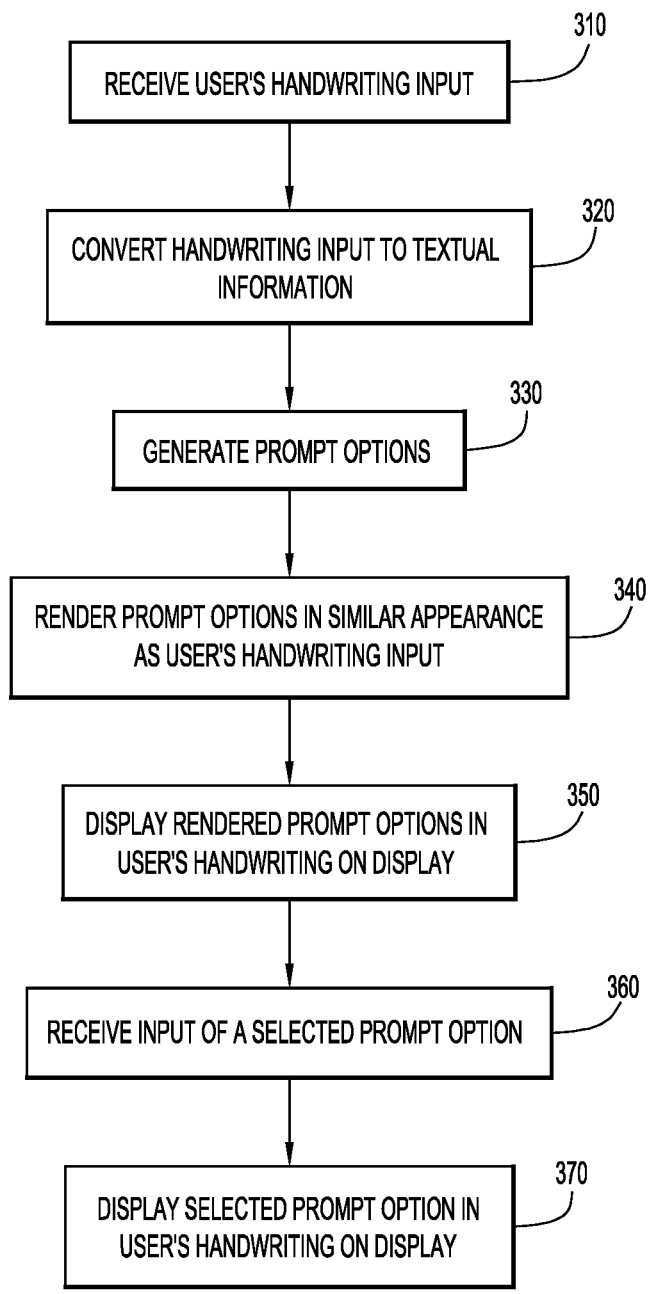
FIG. 3 is a flowchart of a method for performing the handwriting auto-complete function on a touch screen device, according to an example embodiment.

Referring now to FIG. 3, a flowchart of a method 300 for implementing an auto-complete function on apparatus 100 according to an example embodiment is shown. Reference is also made to FIGS. 1 and 2 for purposes of the description of FIG. 3. Method 300 may begin with operation 310, where a user's handwriting input is received. As described above, the user's handwriting input may be provided using input device 132 on display 110, which may be a touch screen display. Next, at operation 320, the user's handwriting input is converted into textual information. For example, converted textual information from the user's handwriting input may be obtained from handwriting recognizer/converter 210. Optionally, additional textual information sources 220 may supply other textual information to textual information combiner 200 to be combined with the textual information converted from the user's handwriting, as described above with reference to FIG. 2.

At operation 330, one or more prompt options are generated based on the textual information. In an example embodiment, the prompt options may be generated by auto-complete prompt generator 125 of apparatus 100. For example, the textual information, such as the handwriting input from the user, may be one or more characters or letters. Auto-complete prompt generator 125 may use this textual information to generate one or more prompt options that are words that begin with the one or more characters or letters from the textual information. Auto-complete prompt generator 125 may use any additional textual information from additional textual information sources 220 to assist with determining the relevancy or rank of possible prompt options based on context during the user session. Auto-complete prompt generator 125 may also use other known algorithms or processes to assist with determining a likelihood or relevancy of possible prompt options.

At operation 340, the one or more prompt options generated at operation 330 are rendered with a similar appearance as the user's handwriting input. In an example embodiment, the rendered prompt options may be generated by auto-complete renderer 126 of apparatus 100 to have a similar appearance as the user's handwriting. For example, a similar appearance of the rendered prompt options may include one or more of a style, a size, or a direction of the handwriting input from the user. The style of a user's handwriting may include features such as shapes of letters or characters, slant or angle of the writing, block or cursive, letter or character spacing, or other similar attributes. The direction of a user's handwriting may include right-to-left or left-to-right writing direction, an orientation or alignment of the letters or characters relative to each other, as well as an orientation or direction of the writing relative to other items on display 110 of apparatus 100. The overall effect of providing the rendered prompt options with a similar appearance as the user's handwriting is to mimic the user's handwriting when providing the auto-complete function so that the rendered prompts and completed words appear to be a continuation of the user's handwriting.

At operation 350, the rendered prompt options having a similar appearance as the user's handwriting input are displayed to the user. For example, the rendered prompt options may be displayed on display 110 of apparatus 100 based on instructions from display controller 112.

At operation 360, a selection of one of the prompt options is received. For example, a user may select one of the prompt options that has been rendered in a similar appearance as the user's handwriting input and displayed on display 110 by using input device 132. The selection of one of the prompt options by the user may be received by auto-complete selector 127. In one example embodiment, each of the one or more prompt options may be associated with a selection indicator that the user may select to choose a particular one of the prompt options as the selected prompt option for the auto-complete function. Auto-complete selector 127 may then transmit the selection of one of the prompt options to auto-complete renderer 126 for rendering of the selected option in the user's handwriting for displaying on display 110. The user may select one of the prompt options in various ways. For example, a user may touch the area of display 110 that corresponds to the prompt option the user wants to select, or may make a gesture on display 110 over the prompt option the user wants to select, such as a swipe or strikethrough motion.

At operation 370, the selected prompt option chosen by the user in operation 360 is displayed with a similar appearance as the user's handwriting input on display 110 of apparatus 100. In an example embodiment, the auto-complete renderer 126 may render the selected prompt option to have a similar appearance as the user's handwriting. After operation 370, method 300 may end. Alternatively, method 300 may repeat to provide an auto-complete function in the user's handwriting for another word, by returning to operation 310 and continuing through the operation described above for method 300.

FIGS. 4 through 9 illustrate representative views of the operations of method 300 implemented on an apparatus 400 for an example user session, according to an example embodiment. In this embodiment, apparatus 400 may be substantially similar to apparatus 100, described above. For example, apparatus 400 includes a display 410, substantially similar to display 110, as well as other components of apparatus 100 that are not shown in FIGS. 4 through 9, such as display controller 112, processor 120, memory 122 (including textual information provider 124, auto-complete prompt generator 125, auto-complete renderer 126, and/or auto-complete selector 127), network interface 130, input device 132, camera 134, and microphone 136.

Figure 4:
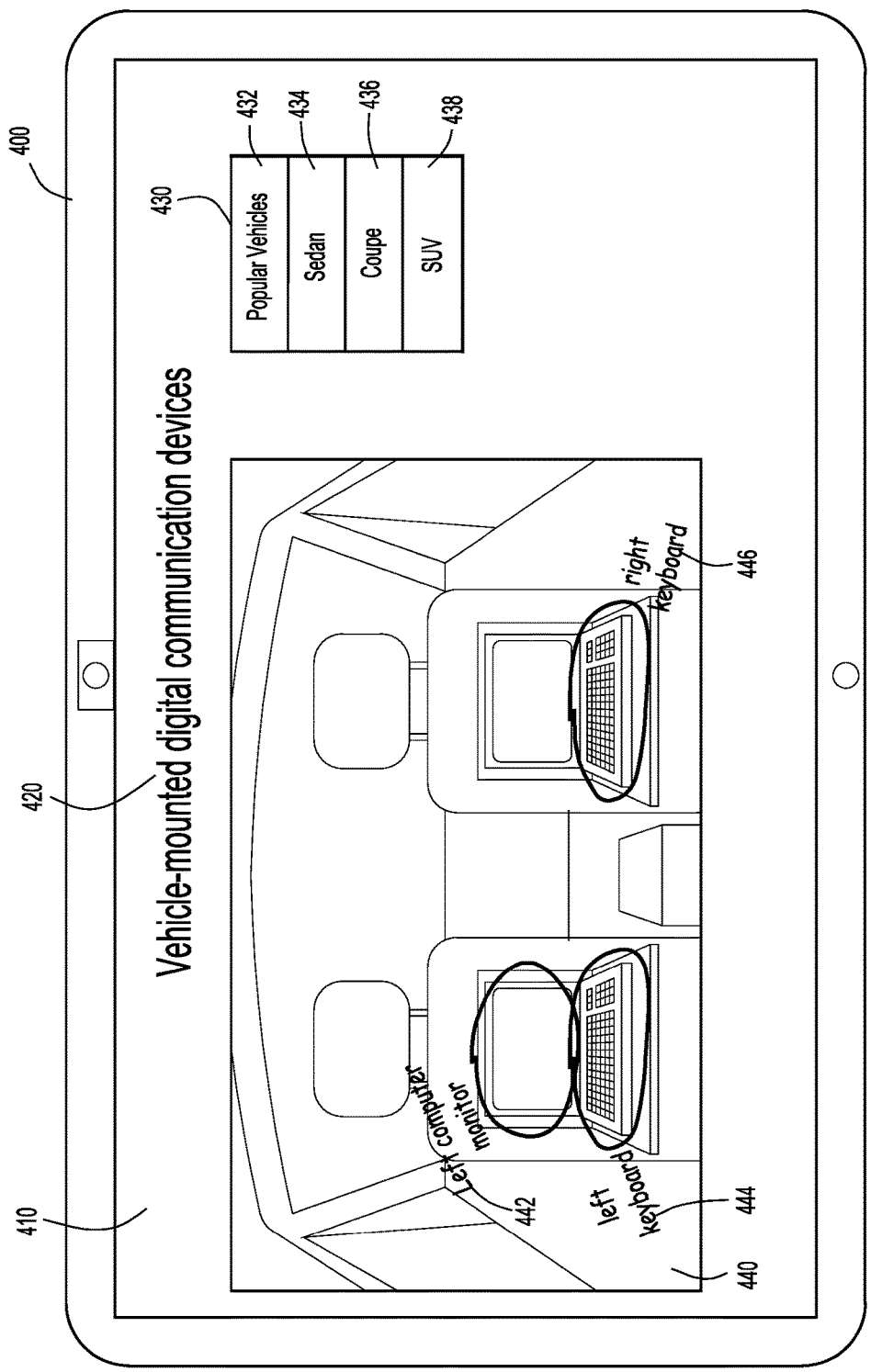
FIGS. 4-9 are views of a touch screen device and showing examples of the various steps of operation of the handwriting auto-complete function, according to an example embodiment.

Referring now to FIG. 4, apparatus 400 including display 410 is shown during a user session. In this session, a variety of images, text, and graphics are shown on display 410. For example, a title 420 having the text "Vehicle-mounted digital communication devices" is displayed along the top of display 410 to indicate the title or name of the presentation or user session. Additional text inputs may be provided in the form of a text list 430, including a heading label 432 having the text "Popular Vehicles", and multiple list entries, including a first list entry 434 having the text "Sedan", a second list entry 436 having the text "Coupe", and a third list entry 438 having the text "SUV". In this example, the text from title 420, text list 430, heading label 432, first list entry 434, second list entry 436, and/or third list entry 438 may be plain text or converted speech-to-text.

In this example embodiment, an image 440 may also be displayed on display 410 of apparatus 400. Image 440 may include one or more user annotations that have been added on top of portions of image 440. For example, a first annotation 442 has been written onto image 440 to identify a screen shown in image 440 with the annotation text "left computer monitor". Additionally, a second annotation 444 identifies a keyboard in image 440 with the annotation text "left keyboard" and a third annotation 446 identifies another keyboard in image 440 with the annotation text "right keyboard". In this example, the text from image 440 and any user annotations, including first annotation 442, second annotation 444, and/or third annotation 446, may be OCR text or historical text.

Figure 5:
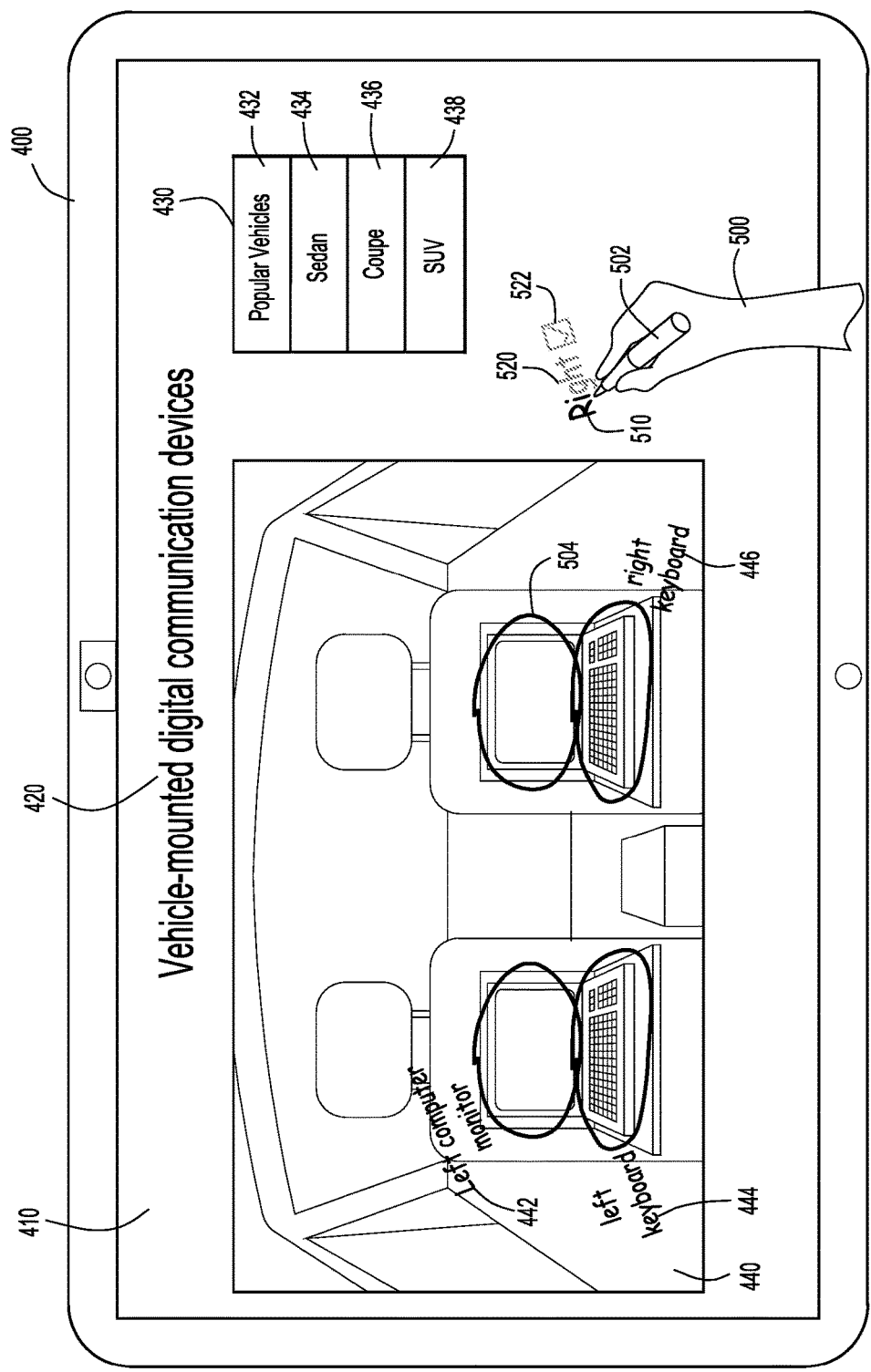

As shown in FIG. 5, a user 500 may use an input device 502 to begin to add a fourth annotation 510 to another screen 504 shown in image 440. User 500 has circled screen 504 in image 440 and has begun writing fourth annotation 510 with the characters "Ri". According to the principles of the example embodiments of the auto-complete function described herein, a prompt option 520 is displayed to user 500 adjacent to the characters "Ri" on display 410. Prompt option 520 is rendered on display 410 with a similar appearance as the handwriting input of characters "Ri" of fourth annotation 510 written on display 410 by user 500. Additionally, a selection indicator 522 is displayed to the right of prompt option 520 to allow user 500 to select prompt option 520 for the auto-complete function.

Figure 6:
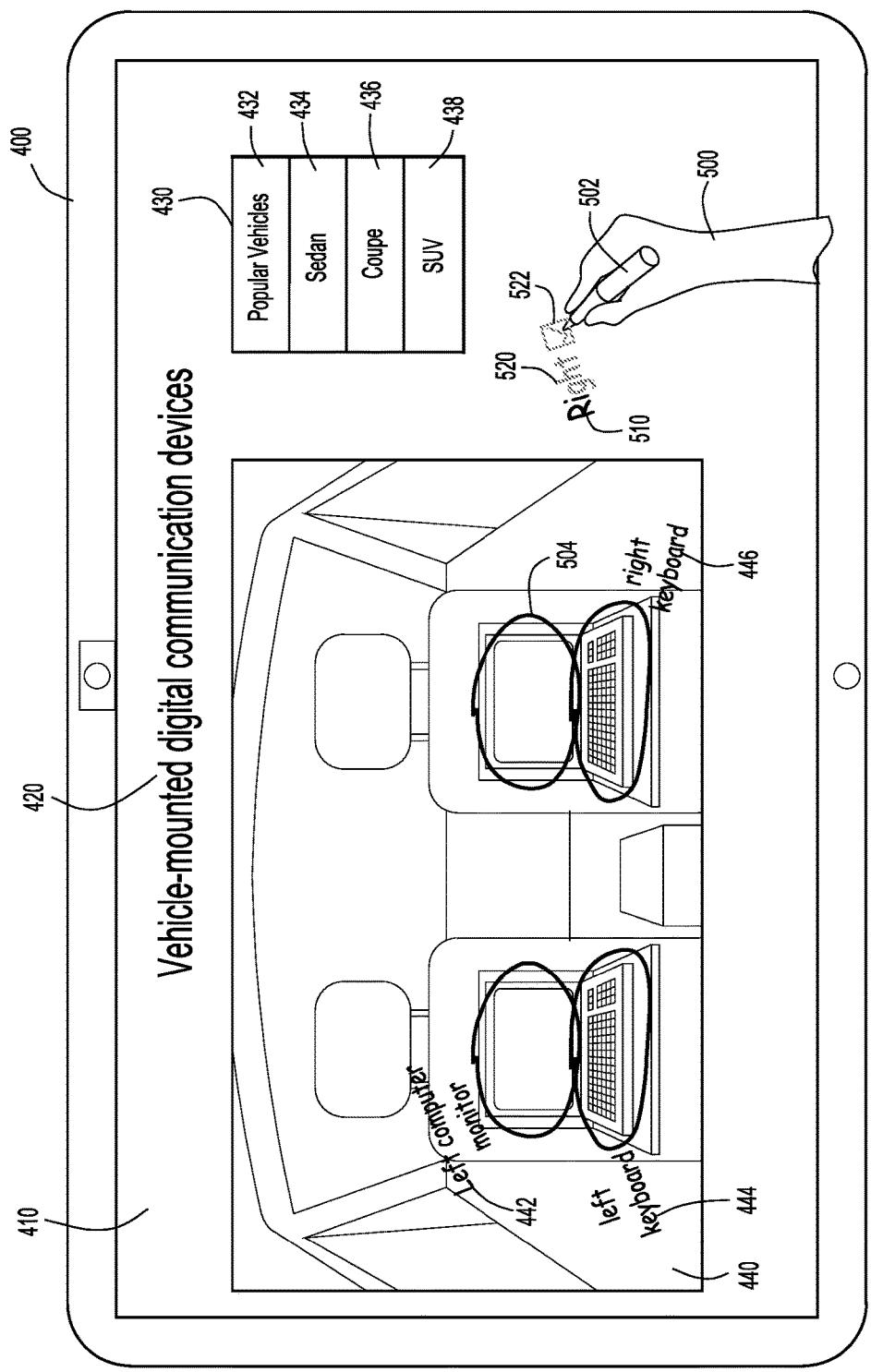

FIG. 6 illustrates user 500 selecting selection indicator 522 using input device 502 to choose prompt option 520 as the selected prompt option to complete the first word of fourth annotation 510 of screen 504 shown in image 440. As shown in FIG. 6, user 500 has selected prompt option 520 that includes rendered text "ght" that has a similar appearance as the characters "Ri" written by user 500 to begin the first word of fourth annotation 510. In an example embodiment, prompt option 520 may have at least one characteristic that is different from a characteristic of the characters "Ri" written by user 500. For example, prompt option 520 may be displayed using a color that is different from a color used by user 500 to write the characters "Ri" on display 410. With this arrangement, prompt option 520 may be visually distinguished to user 500 from the user's own handwriting input shown on display 410.

Figure 7:
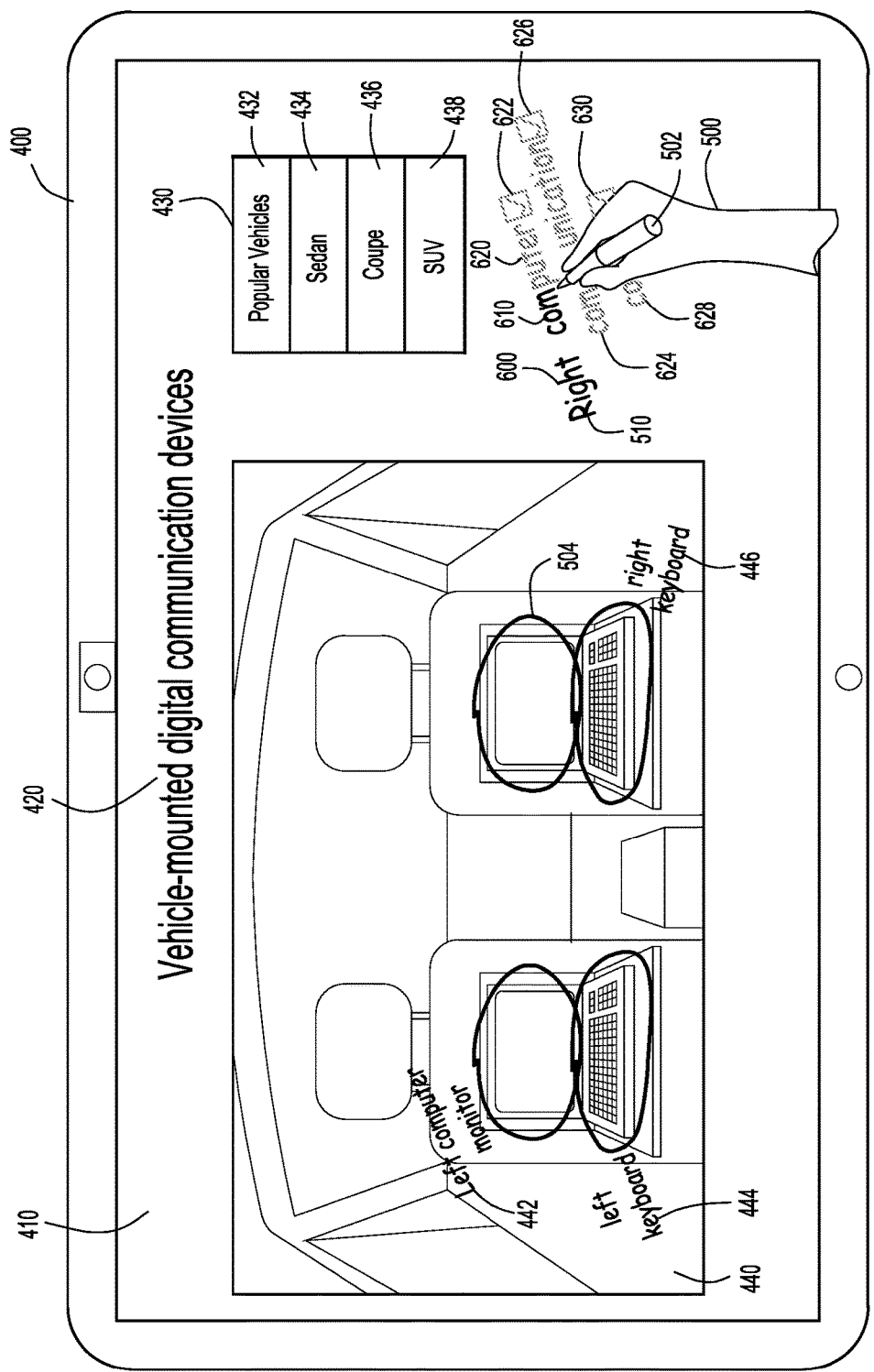

Upon selection by user 500 of selection indicator 522 for prompt option 520, the auto-complete function of the example embodiments renders and displays the selected prompt option 520 on display 410 to complete first word "Right" 600, shown in FIG. 7. The word "Right" 600 is rendered on display 410 of apparatus 400 in the user's handwriting. That is, the auto-completed portion (e.g., "ght") is rendered with a similar appearance as the user's handwriting input portion (e.g., "Ri") so that the completed word "Right" 600 has the same or similar style, size, and/or direction as the handwriting input from user 500. Additionally, once prompt option 520 has been selected, the word "Right" 600 may be rendered with all characters or letters shown on display 410 in the same color. Thus, first word "Right" 600 has the appearance of having been written entirely by user 500 in the user's handwriting.

Referring again to FIG. 7, user 500 may continue writing additional words as part of fourth annotation 510 of screen 504 shown in image 440. In this embodiment, user 500 has begun writing a second word of fourth annotation 510 with the characters "com" 610 located to the right of first word 600. The auto-complete function of the example embodiments may provide user 500 with multiple prompt options, including a first prompt option 620 having a selection indicator 622, a second prompt option 624 having a selection indicator 626, and a third prompt option 628 having a selection indicator 630.

As described above, textual information provider 124 may use multiple sources of textual information to generate and provide prompt options to user 500. In this case, relevant textual information may be obtained from the converted handwriting input by user 500 (e.g., "com" 610) and one or more additional textual information sources. In an example embodiment, auto-complete prompt options may be based on the additional textual information included on display 410. For example, the prompt options shown in FIG. 7, including first prompt option 620, second prompt option 624, and third prompt option 628, may have been generated based on words included in text from first annotation (e.g., "computer"), text from title 420 (e.g. "communication"), and/or text from heading label 432 of text list 430 (e.g., "common"). Each of first prompt option 620, second prompt option 624, and third prompt option 628 is rendered on display 410 with a similar appearance as the handwriting input of characters "com" 610 of fourth annotation 510 written on display 410 by user 500.

Additionally, as described above, the prompt options shown to user 500 may have at least one characteristic that is different from a characteristic of the characters "com" 610 written by user 500. For example, first prompt option 620, second prompt option 624, and/or third prompt option 628 may be displayed using a color that is different from a color used by user 500 to write the characters "com" 610 on display 410. It should be understood that other characteristics may also be used to distinguish the prompt options, such as opacity, line weight, highlighting, etc. With this arrangement, the prompt options may be visually distinguished to user 500 from the user's own handwriting input shown on display 410.

In an example embodiment, the available prompt options, such as first prompt option 620, second prompt option 624, and third prompt option 628, may be dynamically generated as user 500 writes down the one or more characters on display 410. Accordingly, the prompt options may change based on the letters added. In addition, as user 500 writes down additional letters on display 410, the available prompt options and associated selection indicators may shift rightwards, so as to stay to the right of the last letter written down by user 500.

In some example embodiments, the prompt options generated by the auto-complete function described herein may automatically disappear if user 500 ignores the prompt options by failing to make a selection within a certain time period. For example, if user 500 fails to choose first prompt option 620, second prompt option 624, or third prompt option 628, by checking the corresponding selection indicator 622, 626, or 630, the prompt options may automatically disappear or fade from display 410 after approximately 5 seconds or some other set time duration. With this configuration, the auto-complete prompts may be an intermediate assistance for a user's handwriting and may not be kept for a longer time.

Figure 8:
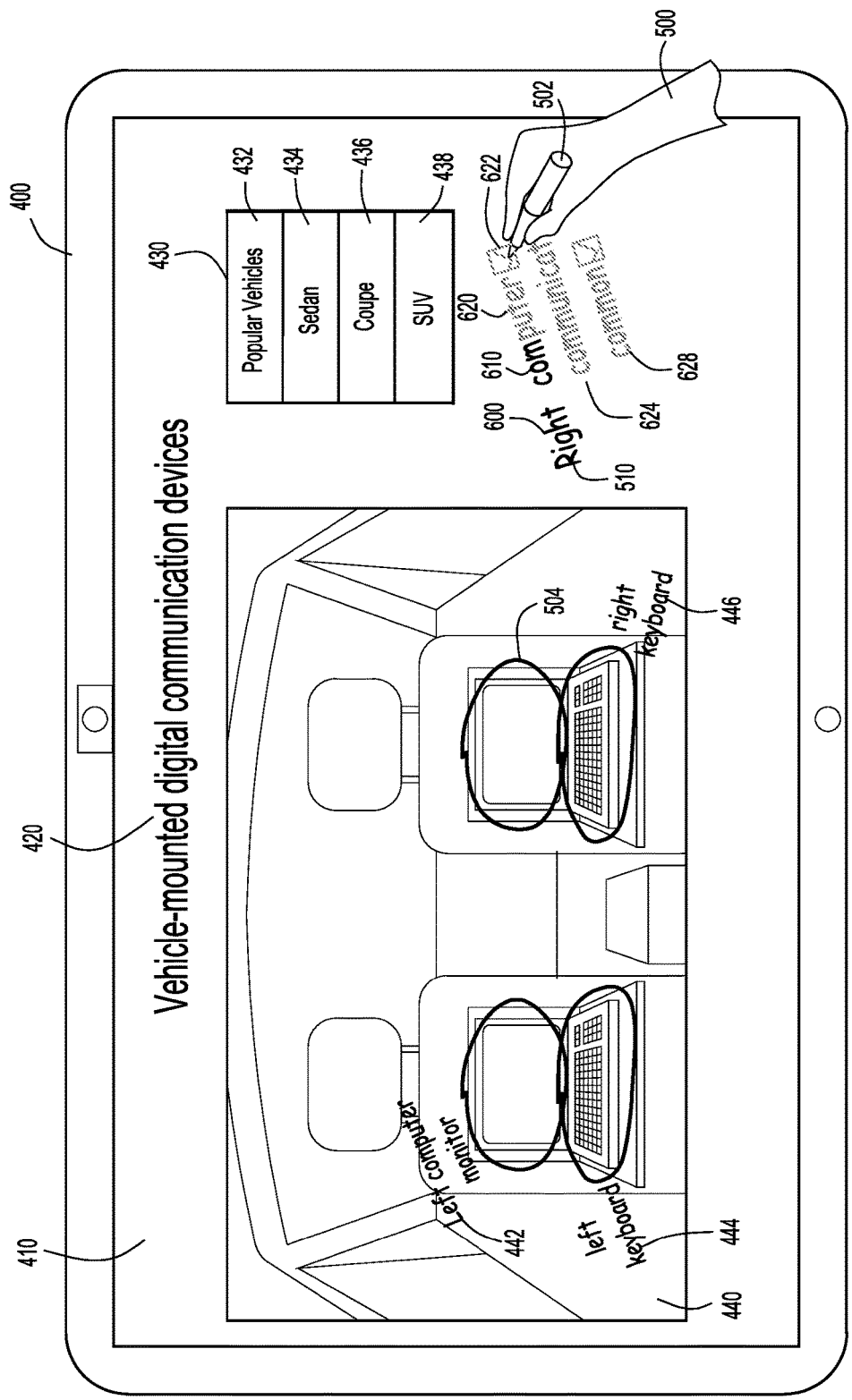

FIG. 8 illustrates user 500 selecting selection indicator 622 using input device 502 to choose first prompt option 620 as the selected prompt option to complete the second word of fourth annotation 510 of screen 504 shown in image 440. As shown in FIG. 8, user 500 has selected first prompt option 622 that includes rendered text "puter" that has a similar appearance as the characters "com" 610 written by user 500 to begin the second word of fourth annotation 510.

Figure 9:
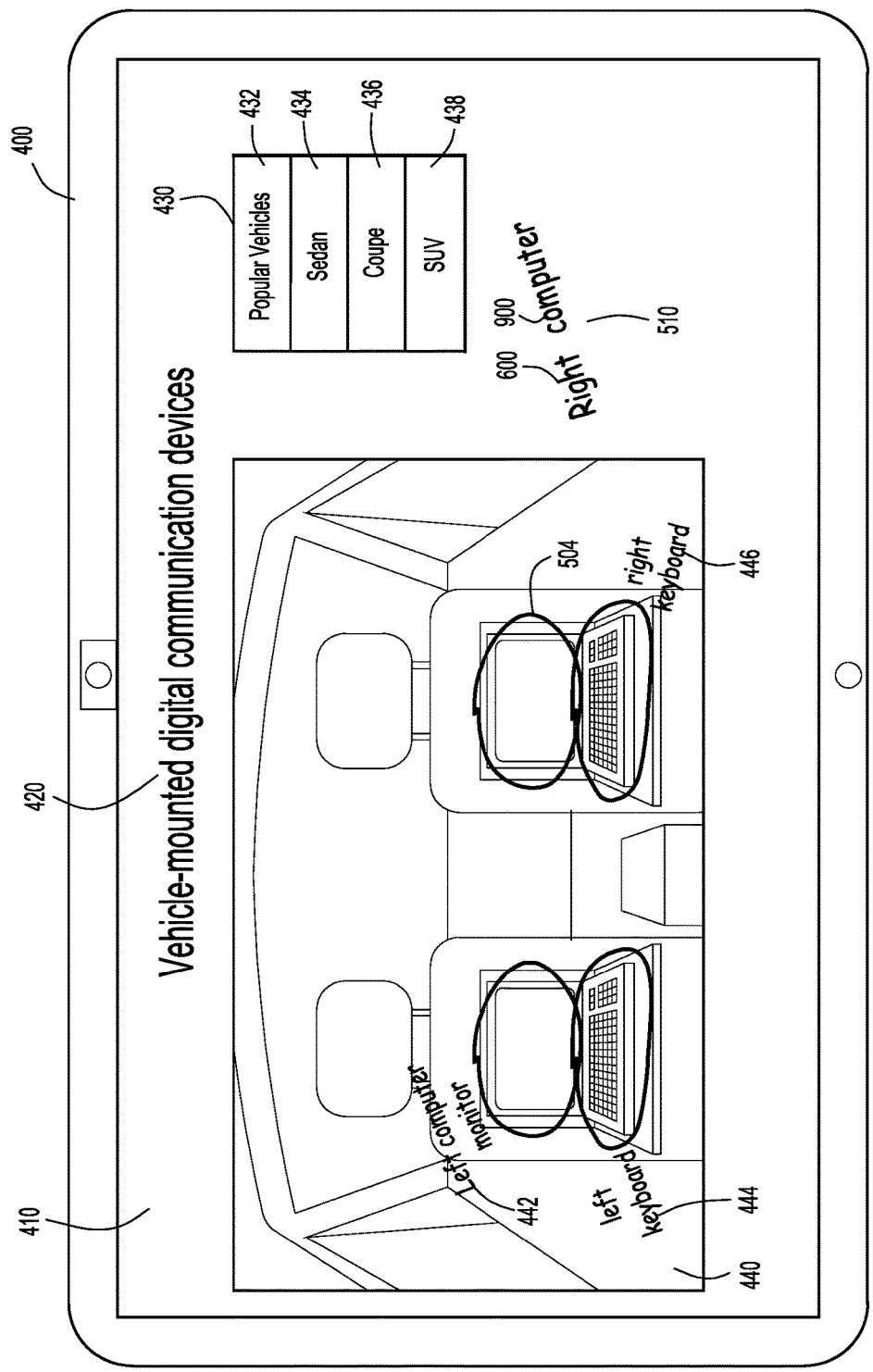

Upon selection by user 500 of selection indicator 622 for first prompt option 620, the auto-complete function of the example embodiments renders and displays the selected first prompt option 620 on display 410 to complete the second word "computer" 900, as shown in FIG. 9. The word "computer" 900 is rendered on display 410 of apparatus 400 in the user's handwriting. That is, the auto-completed portion (e.g., "puter") is rendered with a similar appearance as the user's handwriting input portion (e.g., "com") so that the completed word "computer" 900 has the same or similar style, size, and/or direction as the handwriting input from user 500. Additionally, once first prompt option 620 has been selected, the word "computer" 900 may be rendered with all characters or letters shown on display 410 in the same color. Thus, second word "computer" 900, as well as the entire fourth annotation 510 of screen 504 with text "Right computer", has the appearance of having been written entirely by user 500 in the user's handwriting.

Figure 10:
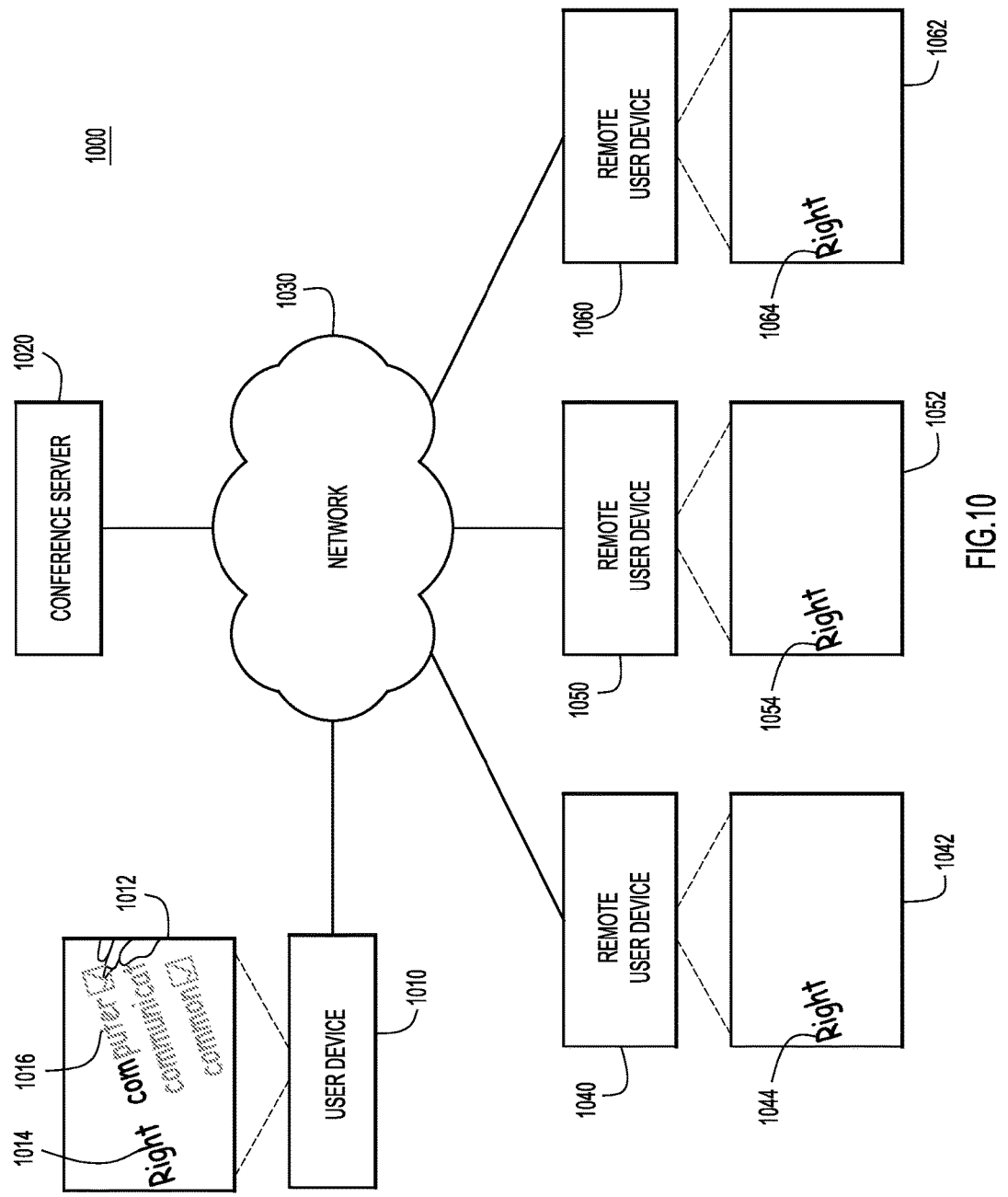
FIG. 10 is a block diagram showing an example of a conference session that includes an apparatus in which the auto-complete function can be implemented and several remote user devices, according to an example embodiment.

In some example embodiments, a user may participate in a collaboration presentation with one or more remote users during a conference session. The principles of the example embodiments for the auto-complete function described herein may employed by a user's device during the conference session. FIG. 10 is a block diagram showing an example of a conference session 1000 that includes a user device 1010 in which the auto-complete function can be implemented and several remote user devices, according to an example embodiment.

In the example embodiment of conference session 1000, user device 1010 may be in communication with a plurality of remote user devices 1040, 1050, 1060. For example, user device 1010 and remote user devices 1040, 1050, 1060 may be connected to a conference server 1020 that is configured to manage conference session 1000. Conference server 1020 can be configured to communicate with participants of conference session 1000, including user device 1010 and one or more remote user devices 1040, 1050, 1060, over a communication network 1030. Communication network 1030 may be, for example, a local access network (LAN) or wide area network (WAN). Also, communication network 1030 may be either wired, wireless, or a combination of wired and wireless. In an example embodiment, communication network 1030 may be the Internet.

Conference session 1000 may allow the participants of the session to commonly view or share a presentation on a display or screen for collaboration and/or annotation. For example, user device 1010 may include a display 1012 and remote user devices 1040, 1050, and 1060 may also include corresponding displays 1042, 1052, and 1062. During conference session 1000, a user of user device 1010 may make annotations or write on the commonly shared presentation on display 1012. Other participants of conference session 1000, including users of remote user devices 1040, 1050, and 1060 may be able to view the annotations or writing on the shared presentation made by user of user device 1010.

In an example embodiment, the prompt options generated by the auto-complete function described herein may visible only on the display of the user employing the apparatus including the auto-complete function. That is, the auto-complete function may operate in a manner such that users of remote user devices 1040, 1050, and 1060 participating in conference session 1000 may not see the prompt options provided to the user of user device 1010. With this arrangement, only the auto-completed word rendered by the auto-complete function of the example embodiments is shown to users on displays 1042, 1052, and 1062 of remote user devices 1040, 1050, and 1060 after one of the prompt options is selected by the user.

For example, as shown in FIG. 10, during conference session 1000, user of user device 1010 may write on display 1012 to add one or more annotations to a shared presentation. In this example, the user has already written the word "Right" 1014 on display 1012. Each of the users of remote user devices 1040, 1050, and 1060 can see the completed word "Right" 1044, 1054, and 1064 on displays 1042, 1052, and 1062. The user of user device 1010 may continue to write on display 1012 to add one or more characters of a second word to annotate the shared presentation. In this case, the user has written "com" to begin the second word of the annotation on display 1012.

As described in the previous embodiments, the auto-complete function generates and renders one or more prompt options 1016 to the user of user device 1010 based on the user writing the characters "com" on display 1012. Prompt options 1016 are provided to the user of user device 1010 in a similar appearance as the user's handwriting, as described above. However, prompt options 1016 are not visible to users of remote user devices 1040, 1050, and 1060. Accordingly, only the completed word "Right" 1044, 1054, and 1064 is shown on remote user displays 1042, 1052, and 1062 until the user of user device 1010 selects one of prompt options 1016 to auto-complete the word.

Once the user makes a selection of one of prompt options 1016, then the auto-complete function may render the selected prompt option in a similar appearance as the user's handwriting to complete the word, and the completed word may be shown to users of remote user devices 1040, 1050, and 1060 on displays 1042, 1052, and 1062. With this arrangement, the auto-complete function of the example embodiments mimics the user's handwriting to give the appearance to the other participants of conference session 1000 that the user has handwritten the entire word in full.

The principles of the example embodiments described herein can facilitate auto-complete prompts in a user's handwriting on touch screen devices, such as electronic whiteboards and other devices. With the auto-complete functions described herein, handwriting on touch screen devices, such as electronic whiteboards and other devices, can become more convenient and efficient. The auto-complete functions described herein can assist with improving user experience and productivity.

The example embodiments allow existing information available in a user session to be reasonably exploited to assist with providing auto-complete prompt options. For example, handwriting inputs, plain text inputs, converted speech-to-text inputs, OCR text, historical text, predetermined text databases, and/or other sources of textual information can assist with providing auto-complete prompt options to a user.

The example embodiments provide an auto-complete prompt in a simple and natural way.

The example embodiments provide a convenient and efficient method for handwriting on a touch screen device, such as an electronic whiteboard.

In summary, an apparatus is provided comprising: a display configured to receive touch user input; a display controller coupled to the display to supply display data for presentation on the display and to detect touch user input on the display; a processor coupled to the display controller, and configured to: convert handwriting input to the display into textual information; generate one or more prompt options based on the textual information; and render the one or more prompt options in a similar appearance as the handwriting input from the user and supply display data for the one or more prompt options to the display controller to the rendered prompt options on the display.

In addition, a method is provided comprising: receiving, from a touch-screen display, a handwriting input; converting the handwriting input into textual information; generating one or more prompt options based on the textual information; and rendering for display on the touch-screen display the one or more prompt options in a similar appearance as the handwriting input.

Furthermore, a non-transitory computer readable storage media encoded with instructions that, when executed by a processor, cause the processor to perform operations is provided comprising: receiving textual information converted from a handwriting input to a touch-screen display from a user, the textual information comprising one or more characters; generating one or more prompt options based on the textual information, the one or more prompt options comprising words that begin with the one or more characters of the textual information; and rendering for display on the touch-screen display the one or more prompt options in a similar appearance as the handwriting input from the user.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a display configured to receive touch user input;
   a display controller coupled to the display to supply display data for presentation on the display and to detect touch user input on the display;
   a processor coupled to the display controller, and configured to:
   convert handwriting input to the display into textual information;
   generate one or more prompt options based on the textual information; and
   render the one or more prompt options in an appearance matching the handwriting input and supply display data for the one or more prompt options to the display controller to render the one or more prompt options on the display.

2. The apparatus of claim 1, wherein the processor is configured to receive the textual information converted from the handwriting input and at least one additional textual information input.

3. The apparatus of claim 2, wherein the at least one additional textual information input includes one or more of:
   a plain text input on the display;
   a speech-to-text converted input;
   an optical character recognition text input converted from an image on the display;
   a historical textual information input obtained during a user session; or
   a predetermined text input associated with a database in communication with the apparatus.

4. The apparatus of claim 3, wherein the historical textual information input obtained during a user session includes at least one of: prior textual information converted from a handwriting input, prior plain text input, prior speed-to-text converted input, or prior optical character recognition text input.

5. The apparatus of claim 1, wherein the processor is further configured to:
   generate for rendering on the display a selection indicator associated with each of the one or more prompt options; and
   receive an input of a selected prompt option.

6. The apparatus of claim 5, wherein the processor is further configured to render for display the selected prompt option with a similar appearance as the handwriting input.

7. The apparatus of claim 6, wherein the processor is configured to:
   render the one or more prompt options with a first characteristic;
   render the selected prompt option with a second characteristic; and
   wherein the first characteristic is different than the second characteristic.

8. The apparatus of claim 7, wherein the first characteristic is a first color, and wherein the second characteristic is a second color.

9. The apparatus of claim 1, wherein the appearance matching the handwriting input of the one or more prompt options includes one or more of: a style, a size, or a direction of the handwriting input.

10. The apparatus of claim 1, wherein the textual information converted from the handwriting input is one or more characters; and
    wherein the one or more prompt options are words that begin with the one or more characters from the textual information.

11. A method comprising:
    receiving, from a touch-screen display, a handwriting input;
    converting the handwriting input into textual information;
    generating one or more prompt options based on the textual information; and
    rendering for display on the touch-screen display the one or more prompt options in an appearance matching the handwriting input.

12. The method of claim 11, wherein generating the one or more prompt options further includes receiving at least one additional textual information input, the at least one additional textual information input includes one or more of:
    a plain text input on the display;
    a speech-to-text converted input;
    an optical character recognition text input converted from an image on the display;
    a historical textual information input obtained during a user session; or
    a predetermined text input associated with a database in communication with the display.

13. The method of claim 12, wherein the historical textual information input obtained during a user session includes at least one of: prior textual information converted from a handwriting input, prior plain text input, prior speed-to-text converted input, or prior optical character recognition text input.

14. The method of claim 11, further comprising:
    displaying a selection indicator associated with each of the one or more prompt options on the display; and
    receiving an input of a selected prompt option.

15. The method of claim 14, further comprising displaying the selected prompt option with a similar appearance as the handwriting input.

16. The method of claim 15, wherein the one or more prompt options are rendered in a first color;
    wherein the selected prompt option is rendered in a second color; and
    wherein the first color is different than the second color.

17. A non-transitory computer readable storage media encoded with instructions that, when executed by a processor, cause the processor to perform operations comprising:
    receiving textual information converted from a handwriting input to a touch-screen display from a user, the textual information comprising one or more characters;
    generating one or more prompt options based on the textual information, the one or more prompt options comprising words that begin with the one or more characters of the textual information; and
    rendering for display on the touch-screen display the one or more prompt options in an appearance matching the handwriting input from the user.

18. The non-transitory computer readable storage media of claim 17, further comprising instructions that cause the processor to send the one or more prompt options to a display area configured to display the one or more prompt options adjacent to the handwriting input from the user.

19. The non-transitory computer readable storage media of claim 17, wherein the instructions for generating the one or more prompt options are based on at least one additional textual information input.

20. The non-transitory computer readable storage media of claim 17, wherein the appearance matching the handwriting input from the user of the rendered one or more prompt options includes one or more of a style, a size, or a direction of the handwriting input from the user.

* * * * *